US006185767B1

(12) United States Patent
Brooke et al.

(10) Patent No.: US 6,185,767 B1
(45) Date of Patent: Feb. 13, 2001

(54) CONTROLS FOR A BED

(75) Inventors: Jason C. Brooke, Mount Pleasant; Michael J. Mutka, North Charleston; William S. Larisey, Jr., Summerville; Reza Hakamiun, Charleston; James F. Thomas, Mount Pleasant; Kendall O. Shows, Summerville, all of SC (US)

(73) Assignee: Hill-Rom, Inc., Batesville, IN (US)

( * ) Notice: Under 35 U.S.C. 154(b), the term of this patent shall be extended for 0 days.

(21) Appl. No.: 09/263,511

(22) Filed: Mar. 5, 1999

Related U.S. Application Data

(62) Division of application No. 08/770,547, filed on Dec. 3, 1996, now Pat. No. 5,878,452.

(51) Int. Cl.[7] .............................. A61C 7/05; A47C 21/08

(52) U.S. Cl. .......................... 5/600; 5/425; 5/430; 5/658; 5/663

(58) Field of Search ................................ 5/600, 425, 427, 5/428, 429, 430, 663, 658

(56) References Cited

U.S. PATENT DOCUMENTS

| | | | |
|---|---|---|---|
| D. 336,578 | 6/1993 | Celestina . | |
| 2,625,694 | 1/1953 | Moss . | |
| 2,722,017 | 11/1955 | Burst et al. . | |
| 3,069,700 | 12/1962 | Berlin . | |
| 3,585,659 | 6/1971 | Burst et al. . | |
| 3,593,350 | 7/1971 | Knight et al. . | |
| 3,633,225 | 1/1972 | Burst et al. . | |
| 3,711,876 | 1/1973 | Kirkland et al. . | |
| 4,025,972 | 5/1977 | Adams et al. . | |
| 4,097,939 | 7/1978 | Peck et al. . | |
| 4,097,940 | 7/1978 | Tekulve et al. . | |
| 4,183,015 * | 1/1980 | Drew et al. | 5/425 X |
| 4,612,679 * | 9/1986 | Mitchell | 5/425 |
| 4,839,933 | 6/1989 | Plewright et al. . | |
| 5,083,334 | 1/1992 | Huck et al. . | |
| 5,084,925 | 2/1992 | Cook . | |
| 5,148,562 | 9/1992 | Borders et al. . | |
| 5,317,769 | 6/1994 | Weismiller et al. . | |
| 5,347,682 | 9/1994 | Edgerton, Jr. . | |
| 5,384,927 | 1/1995 | Mardero et al. . | |
| 5,732,423 * | 3/1998 | Weismiller et al. | 5/425 |
| 5,802,640 * | 9/1998 | Ferrand et al. | 5/617 |
| 6,000,076 * | 12/1999 | Webster et al. | 5/600 X |

OTHER PUBLICATIONS

Bed–Bar Model 1200H, Brown Engineering Corporation, advertising literature, 3 pages, date unknown.
Hill–Rom 720 All–Electric Bed, Hill–Rom Company, Inc., advertising literature, 4 pages, date unknown.
Paramount Bed, catalog pp. 64 and 86,date unknown.

* cited by examiner

*Primary Examiner*—Michael F. Trettel
(74) *Attorney, Agent, or Firm*—Bose McKinney & Evans LLP

(57) ABSTRACT

A bed includes a base frame, a bed deck above the base frame, and an intermediate frame carrying the bed deck. The intermediate frame is mounted to the base frame for movement relative to the base frame between a raised position spaced apart above the base frame and a lowered position below the raised position. The bed also includes a side rail mounted to the intermediate frame and extending generally upwardly therefrom to a top of the side rail, a drive assembly coupling the intermediate frame to the base frame, and control buttons mounted on the side rail and coupled to the drive assembly so that activation of the control buttons activates the drive assembly. The drive assembly moves the intermediate frame between the raised position and the lowered position when the drive assembly is activated. The control buttons include resident control buttons facing toward the bed deck and caregiver control buttons facing away from the bed deck. The resident control buttons are spaced apart from the top by a first distance and the caregiver control buttons being spaced apart from the top by a second distance that is greater than the first distance.

18 Claims, 9 Drawing Sheets

CONTROLS FOR A BED

This application is a divisional of U.S. application Ser. No. 08/770,547, filed Dec. 3, 1996, now U.S. Pat. No. 5,878,452.

BACKGROUND AND SUMMARY OF THE INVENTION

The present invention relates to long term care beds and particularly to controls for long term care beds. More particularly, the present invention relates to a long term care bed including a bed deck supporting a mattress having a sleeping surface for carrying a long term care resident, the deck and mattress being movable relative to the floor so that the sleeping surface can be lowered to a position adjacent to the floor.

Many hospital beds include a patient-support surface that can be raised and lowered relative to the floor. Adjusting the height of the patient-support surface allows both for maximizing the convenience of caregivers working at the hospital bed and for assisting the ingress and egress of patients to and from the patient-support surface. See, for example, U.S. Pat. Nos. 4,097,939 to Peck et al.; 4,097,940 to Tekulve et al.; 5,317,769 to Weismiller et al.; 5,248,562 to Borders et al.; 3,711,876 to Kirkland et al.; and 4,025,972 to Adams et al., each of which is assigned to the assignee of the present invention and each of which discloses a hospital bed or a stretcher having a patient-support surface that can be raised and lowered relative to the floor.

Hospital beds and stretchers are often provided with casters so that the bed can be moved or, particularly for stretchers, so that the stretcher and the resident can be transported. These devices are commonly provided with a caster braking system to prevent movement of the device when the caregiver wishes to keep the device stationary. See, for example, U.S. Pat. No. 5,347,682 to Edgerton, Jr., disclosing a patient-support device having casters and including a braking system for preventing movement of the device.

Hospital beds and stretchers are also typically provided with side guard rails to prevent movement of the patient past the sides of the sleeping surface. See, for example, U.S. Pat. Nos. 5,083,334 to Huck et al. and 3,585,659 and 2,722,017 to Burst et al., each of which is assigned to the assignee of the present invention and each of which discloses a patient-support device including side guard rails that extend upwardly past the sleeping surface a fixed distance above the patient-support surface.

In accordance with the present invention, a bed includes a base frame, a bed deck above the base frame, and an intermediate frame carrying the bed deck. The intermediate frame is mounted to the base frame for movement relative to the base frame between a raised position spaced apart above the base frame and a lowered position below the raised position. The bed also includes a side rail mounted to the intermediate frame and extending generally upwardly therefrom to a top of the side rail, a drive assembly coupling the intermediate frame to the base frame, and control buttons mounted on the side rail and coupled to the drive assembly so that activation of the control buttons activates the drive assembly. The drive assembly is configured to move the intermediate frame between the raised position and the lowered position when the drive assembly is activated. The control buttons include resident control buttons facing toward the bed deck and caregiver control buttons facing away from the bed deck. The resident control buttons are spaced apart from the top by a first distance and the caregiver control buttons being spaced apart from the top by a second distance that is greater than the first distance.

In the illustrated embodiment, the side rail includes a top portion defining the top. The top portion has a first width. The side rail is formed to include an undercut portion spaced apart from the top portion and adjacent to the resident control buttons. The undercut portion has a second width that is less than the first width. The undercut portion cooperates with the top portion to define a grasping point adjacent to the resident control buttons that can be grasped by the resident when operating the resident control buttons.

Also in the illustrated embodiment, the bed deck is an articulated deck having longitudinally spaced-apart head, seat, and leg sections. At least one of the head, seat, and leg sections is a movable section pivotally coupled to the intermediate frame for movement between a generally horizontal lowered position and an upward raised position. The bed further includes a second drive assembly coupling the movable section to the intermediate frame. The second drive assembly moves the movable section between the raised and lowered positions when the second drive assembly is activated. The control buttons further include second resident control buttons coupled to the second drive assembly, mounted to the side rail, and facing toward the bed deck and second caregiver control buttons coupled to the second drive assembly, mounted to the side rail, and facing away from the bed deck.

Illustratively, the second resident control buttons are spaced apart from the top by a third distance and the second caregiver control buttons being spaced apart from the top by a fourth distance that is greater than the third distance. Also illustratively, the third distance is generally equal to the first distance and the fourth distance is generally equal to the second distance so that the first and second resident control buttons are generally horizontally aligned and the first and second caregiver control buttons are generally horizontally aligned.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
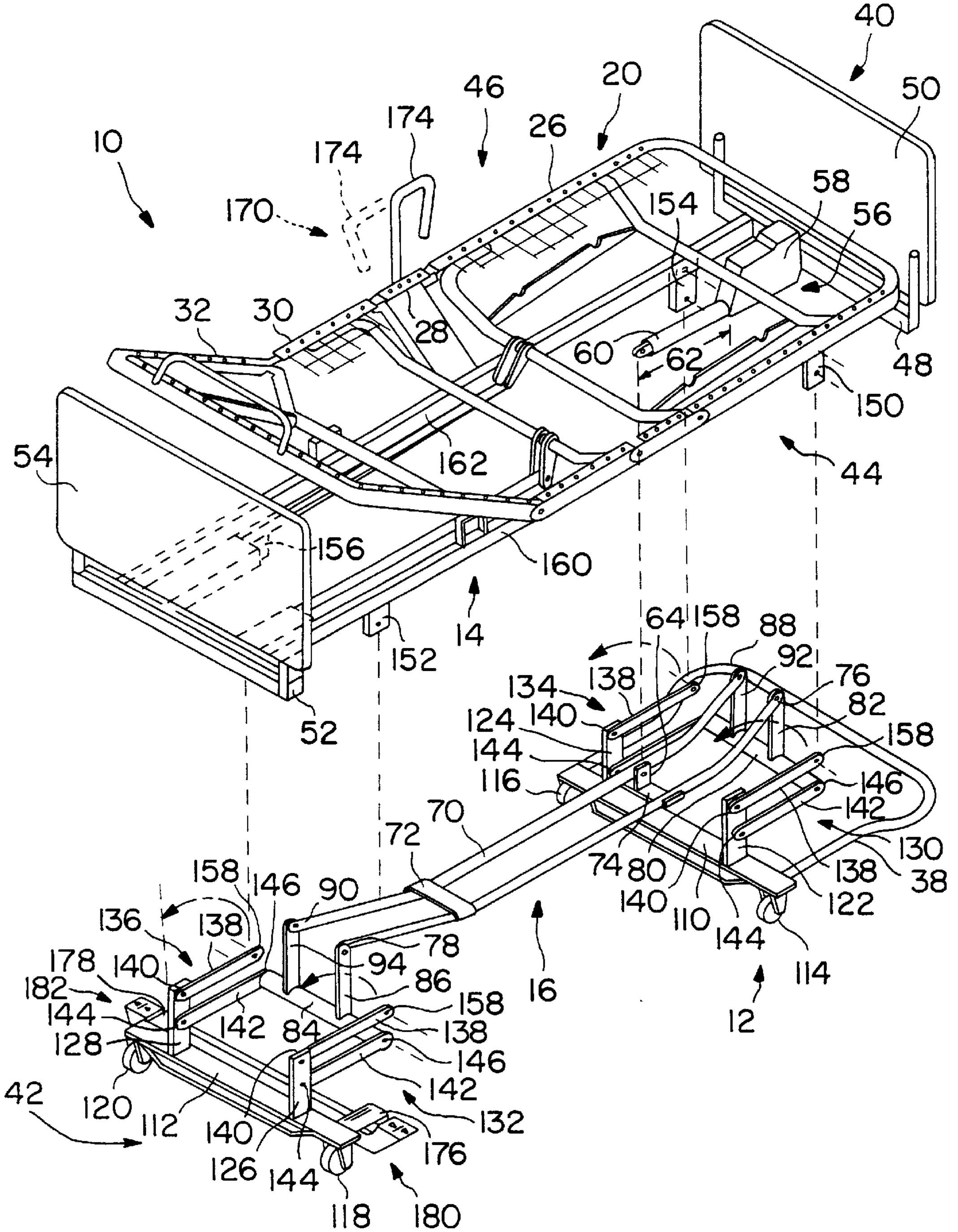
FIG. 1 is an exploded perspective view of a long term care bed in accordance with the present invention showing a base frame engaging the floor, an intermediate frame coupled to the base frame for upward and downward movement relative to the base frame and to the floor, and a bed deck carried by the intermediate frame, the deck being configured to support a mattress (not shown) for carrying a long term care resident.

A long term care bed 10 includes a base frame 12 and an intermediate frame 14 coupled to base frame 12 by a drive assembly 16 as shown in FIG. 1. Drive assembly 16 moves intermediate frame 14 between a raised position spaced apart from base frame 12 and spaced apart from the floor 18 beneath base frame 12, as shown best in FIG. 2a, and a lowered position resting on base frame 12, as shown best in FIG. 2b. A bed deck 20 is connected to intermediate frame 14 and carries a mattress 22 having a generally upwardly-facing sleeping surface 24. Thus, as drive assembly 16 moves intermediate frame 14 between the raised position and the lowered position, sleeping surface 24 and a long term care resident (not shown) resting on sleeping surface 24 move relative to base frame 12 and floor 18.

Deck 20 is an articulating deck including longitudinally spaced-apart head, seat, thigh, and leg sections 26, 28, 30, 32 as shown in FIG. 1. Head section 26, thigh section 30, and leg section 32 are each individually movable relative to one another, relative to seat section 28, and relative to intermediate frame 14, and seat section 28 is fixed to intermediate frame 14 by a bar 34. While deck 20 is an articulating deck having a plurality of movable deck sections 26, 30, 32, it is within the scope of the invention as presently perceived for deck 20 to be a unitary deck having no movable sections, for deck 20 to have only one movable deck section, and for deck 20 to have any desired number of movable deck sections. Thus, any desired type of bed deck can be carried by intermediate frame 14 without exceeding the scope of the invention as presently perceived.

Bed 10 includes a head end 40, a foot end 42, a first side 44, and a second side 46 as shown in FIG. 1. A head frame 48 is attached to head end 40 of intermediate frame 14 as shown in FIGS. 1–3 and a head board 50 is attached to head frame 48. A bumper 38 is connected to base frame 12 to protect head board 50 and to ensure that head end 40 of bed 10 is always spaced apart from adjacent walls 164 a sufficient distance to allow for the movement of intermediate frame 14 relative to base frame 12 without bead board 50 or intermediate frame 14 touching walls 164 near bed 10. In addition, a foot frame 52 is attached to foot end 42 of intermediate frame 14 and a foot board 54 is attached to foot frame 52.

Figure 2A:
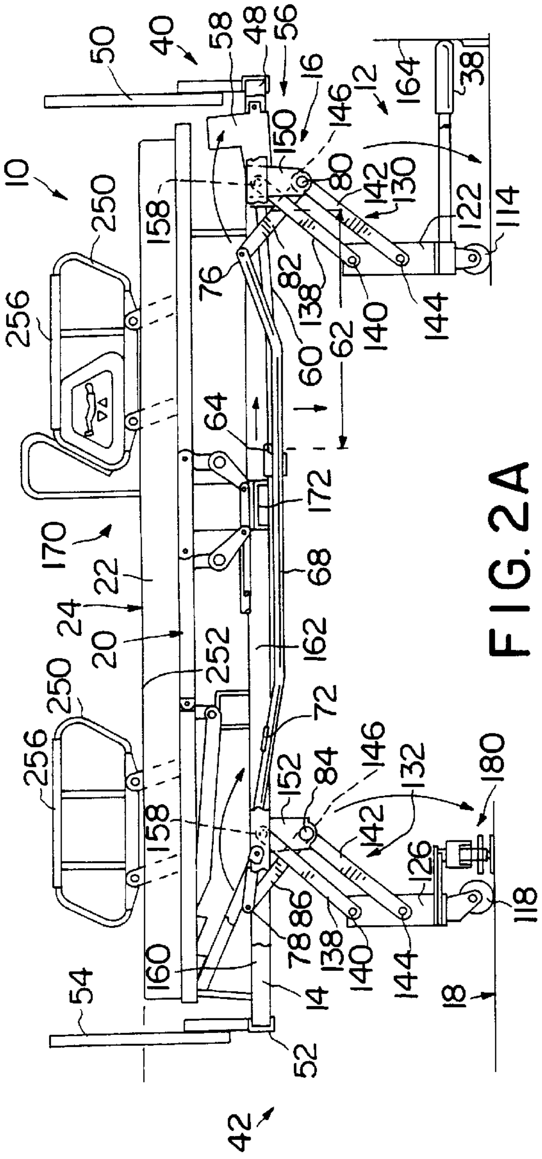
FIG. 2*a* is a side elevation view of the bed of FIG. 1 with portions broken away showing the deck carrying a mattress and the intermediate frame moved to a raised position spaced-apart above the base frame.
Figure 2B:
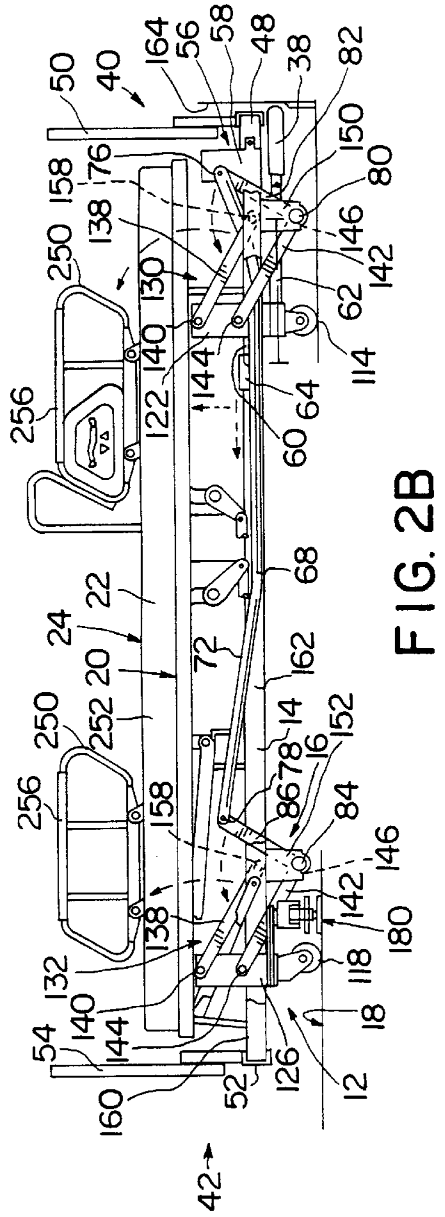
FIG. 2*b* is a view similar to FIG. 2*a* showing the intermediate frame moved to a lowered position resting on the base frame so that the distance between a generally upwardly-facing sleeping surface of the mattress and the floor is minimized.

Drive assembly 16 includes a driver 56 having a motor 58 attached to head frame 48 and a linear actuator 60 having a length 62 that extends and retracts in response to the operation of motor 58 as shown in FIGS. 2a and 2b. It is well known in the hospital bed art that electric drive motors with various types of transmission elements including lead screw drives and various types of mechanical linkages may be used to cause relative movement of portions of hospital beds and stretchers. As a result, the term "driver" and "driver 56" when used relative to drive assembly 16 in the specification and in the claims is intended to cover all types of mechanical, electromechanical, hydraulic, and pneumatic drivers that can extend and retract to raise and lower intermediate fame 14 relative to base frame 12, including manual cranking mechanisms of all types, and including combinations thereof such as hydraulic cylinders in combination with electromechanical pumps for pressurizing fluid received by the hydraulic cylinders.

Motor 58 of driver 56 is attached to head frame 48 thereby fixing motor 58 relative to intermediate frame 14 and actuator 60 is coupled to motor 58 and to a flange 64 of drive assembly 16 so that as motor 58 causes actuator to extend, flange 64 is pushed away from bead frame 48, and as motor 58 causes actuator to retract, flange 64 is pulled toward head frame 48. Flange 64 is movable relative to base frame 12 and relative to intermediate frame 14 and drive assembly 16 is configured so that as flange 64 moves relative to head frame 48, intermediate frame 14 moves relative to base frame 12 between the raised and lowered positions.

Drive assembly 16 further includes spaced-apart, generally parallel, and longitudinally-extending first and second bars 68, 70 as shown best in FIG. 1. Bars 68, 70 are connected to one another by a first brace 72 and a second brace 74. Flange 64 is fixed to second brace 74. Thus, as flange 64 is pushed away from or pulled toward head frame 48, second brace 74 and bars 68, 70 also move away from or toward head frame 48 as shown in FIGS. 2*a* and 2*b*.

First bar 68 has a first end 76 and a second end 78 as shown in FIG. 1. First end 76 is connected to a head end shaft 80 by a link 82 fixed to shaft 80 and extending radially outwardly therefrom. Second end 78 is connected to a foot end shaft 84 by a link 86 fixed to shaft 84 and extending radially outwardly therefrom. Likewise, second bar 70 has first and second ends 88, 90. First end 88 is connected to shaft 80 by a link 92 fixed to shaft 80 and extending radially outwardly therefrom and second end 90 is connected to shaft 84 by a link 94 fixed to shaft 84 and extending radially outwardly therefrom.

Base frame 12 includes a head end transverse member 110 extending generally transversely between two head end casters 114, 116 and a foot end transverse member 112 extending generally transversely between two foot end casters 118, 120 as shown in FIG. 1. Transversely spaced-apart first and second head end brackets 122, 124 are fixed to member 110 and extend generally upwardly therefrom and transversely spaced-apart first and second foot end brackets 126, 128 are fixed to member 112 and extend generally upwardly therefrom.

Drive assembly 16 includes fours sets 130, 132, 134, 136 of parallel links, each set 130, 132, 134, 136 being associated with one of brackets 122, 124, 126, 128, respectively, as shown in FIG. 1. Each set 130, 132, 134, 136 includes a first link 138 having a first end 140 pivotally coupled to its respective bracket 122, 124, 126, 128 and a second link 142 having a first end 144 vertically spaced apart beneath first end 140 of first link 138 and pivotally coupled to its respective bracket 122, 124, 126, 128. A second end 146 of each second link 142 is fixed to its respective shaft 80, 84 so that shaft 80, 84 is restrained against rotation relative to link 142. Thus, as flange 64 is pushed away from head frame 48, bars 68, 70 move toward foot end 42 of bed 10 and links 82, 86, 92, 94 move toward foot end 42 of bed 10 and are pushed upwardly by second links 142 as second links 142 are rotated about their respective first ends 144.

Intermediate frame 14 includes four generally downwardly extending flanges 150, 152, 154, 156. Second end 146 of each second link 142 is pivotally coupled to its respective flange 150, 152, 154, 156 as shown in FIG. 1. In addition, a second end 158 of each first link 138 is pivotally coupled to its respective flange 150, 152, 154, 156 and is spaced apart from and positioned to lie above second end 146 of its respective second link 142. Thus, each set 130, 132, 134, 136 of links defines a parallelogram mechanism connecting intermediate frame 14 to base frame 12 so that as flange 64 of drive assembly 16 moves relative to head frame 48, flanges 150, 152, 154, 156 of intermediate frame 14 move upwardly and downwardly relative to base frame 12 and floor 18. Sets 130, 132, 134, 136 of links will be referred to hereinafter as parallelogram mechanisms 130, 132, 134, 136.

When actuator 60 is extended, maximizing length 62 as shown in FIG. 2*a*, intermediate frame 14 is in the raised position spaced apart from base frame 12. Moving actuator 60 to the extended position maximizes the distance between flange 64 of drive assembly 16 and head frame 48 pushing bars 68, 70 toward foot end 42 of base frame 12 and away from head end 40 of base frame 12. Pushing bars 68, 70 toward foot end 42 of base frame 12 pushes links 82, 86, 92, 94 toward foot end 42, links 82, 86 and links 92, 94 pull shafts 80, 84, respectively, toward foot end 42, and the movement of shafts 80, 84 rotates first and second links 138, 142 of each parallelogram mechanism 130, 132, 134, 136 upwardly, moving flanges 150, 152, 154, 156 and intermediate frame 14 upwardly.

Moving actuator 60 to the retracted position minimizes the distance between flange 64 of drive assembly 16 and head frame 48 pulling bars 68, 70 toward head end 40 of base frame 12 and away from foot end 40 of base frame 12 as shown in FIG. 2*b*. Pulling bars 68, 70 toward head end 40 of base frame 12 pulls links 82, 86, 92, 94 toward head end 40, links 82, 86 and links 92, 94 push shafts 80, 84, respectively, toward head end 40, and the movement of shafts 80, 84 rotates first and second links 138, 142 of each parallelogram mechanism 130, 132, 134, 136 downwardly, moving flanges 150, 152, 154, 156 and intermediate frame 14 downwardly.

When actuator 60 is retracted, minimizing length 62 as shown in FIG. 2*b*, intermediate frame 14 is in the lowered position having side members 160, 162 of intermediate frame 14 resting on transverse members 110, 112 of base frame 12. It also can be seen that when intermediate frame 14 is in the lowered position, flanges 150, 152, 154, 156 extend downwardly from intermediate frame 14 and past transverse members 110, 112 of base frame 12 so that second end 158 of first link 138 of each parallelogram mechanism 130, 132, 134, 136 is closer to floor 18 than first end 144 of second link 142 of each parallelogram mechanism 130, 132, 134, 136.

As described above, bumper 38 is fixed to head end 40 of base frame 12 as shown in FIGS. 1, 2*a*, and 2*b*. As intermediate frame 14 moves from the raised position, shown in FIG. 2*a*, to the lowered position, shown in FIG. 2*b*, intermediate frame also translates toward head end 40 of bed 10. Bumper 38 is positioned to lie so that bumper 38 extends farther in the direction of head end 40 of bed 10 than intermediate frame 14 extends at any point during movement of intermediate frame 14 between the raised position and the lowered position. Thus, as shown best in FIG. 2*b*, bumper 38 operates to space bed 10 a sufficient distance away from a wall 164 adjacent to head end 40 of bed 10 so that intermediate frame 14 can move relative to base frame 12 between the raised position and the lowered position without touching wall 164.

An ambulatory assist arm 170 is attached to intermediate frame 14 of bed 10 as shown in FIGS. 1, 2*a*, 3*a*, and 3*b*. Arm 170 includes a first end 172 coupled to intermediate frame 14 and arm 170 extends generally upwardly therefrom terminating at a grip 174 spaced apart from first end 172 and positioned to lie above sleeping surface 24 of mattress 22 and above side rail 250 as shown in FIGS. 2*a* and 2*b*. Because first end 172 is coupled to intermediate frame 14, movement of intermediate frame 14 relative to base frame 12 does not affect the position of grip 174 relative to sleeping surface 24. However, ambulatory assist arm 170 is rotatable relative to intermediate frame 14 so that the orientation of grip 174 relative to sleeping surface 24 can be adjusted side-to-side as shown, for example, in FIG. 1.

Grip 174 of ambulatory assist arm 170 provides a secure structure for the resident to hold during ingress to and egress from sleeping surface 24 of bed 10. Grip 174 is coupled to intermediate frame 14 and moves with intermediate frame 14 and mattress 22 during movement of intermediate frame 14 between the raised and lowered positions so that the resident will have a consistent and reliable support to grasp when entering or exiting bed 10.

Figure 3B:
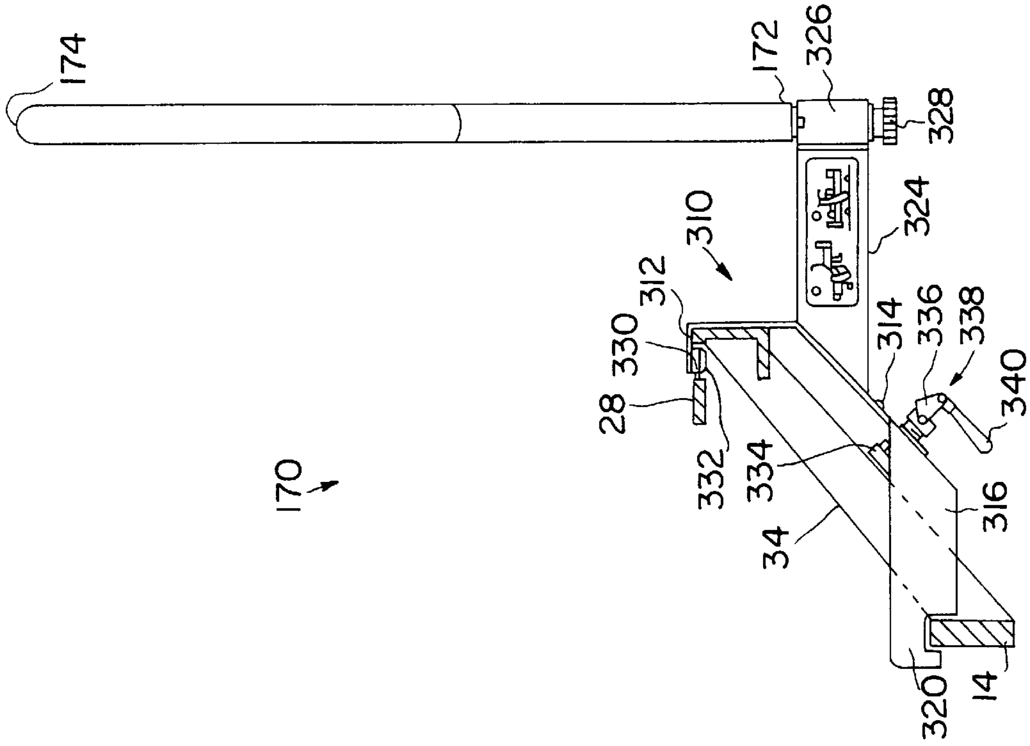
FIG. 3b is a diagrammatic side elevation view with portions broken way of the ambulatory assist arm connected to the bed.
Figure 3A:
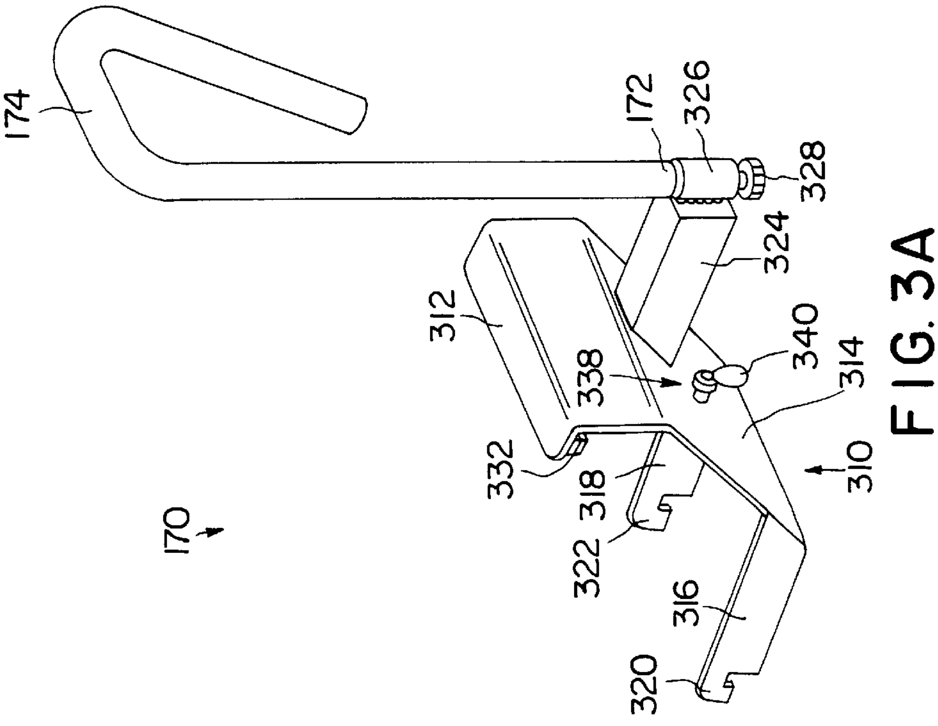
FIG. 3*a* is a perspective view of an ambulatory assist arm of FIG. 1 showing a bracket for connecting the ambulatory assist arm to the bed, a handle positioned to lie above the bracket, and a knob beneath the bracket and movable to an adjusting position allowing the handle to rotate relative to the bracket in order to adjust the side-to-side position of the handle relative to the bracket.

Ambulatory assist arm 170 is mounted to bed 10 by a bracket 310 shown in FIGS. 3*a* and 3*b*. Bracket 310 includes an upper flange 312, a body portion 314 extending downwardly from upper flange 312, and spaced-apart first and second lower flanges 316, 318 extending inwardly from body portion 314 toward intermediate frame 14, each flange 316, 318 terminating in a hook 320, 322, respectively. A bar 324 extends outwardly from body portion 314 and a socket 326 is attached to the outward end of bar 324. First end 172 of ambulatory assist arm 170 is mounted in socket 326 and a set screw 328 can be moved to a locking position fixing ambulatory assist arm 170 relative to bracket 310, intermediate frame 14, and sleeping surface 24. Set screw 328 can be loosened and moved to a releasing position allowing ambulatory assist arm 170 to rotate in socket 326.

Although the locking mechanism for locking ambulatory assist arm 170 relative to bar 324 and thus to bracket 310, intermediate frame 14, and sleeping surface 24 is set screw 328 and socket 326, the locking mechanism can include a clamp, a spring loaded lock, a locking pin, or any suitable device for fixing ambulatory assist arm 170 relative to bracket 310 and allowing for the adjustment of the position of ambulatory assist arm 170 relative to bracket 310 while bracket 310 is coupled to intermediate frame 14. Thus, ambulatory assist arm 170 has first end 172 coupled to intermediate frame 14 and grip 174 spaced apart from first end 172 and positioned to lie above sleeping surface 24. Arm 170, and thus grip 174, is fixed relative to intermediate frame 14 when the locking mechanism is in the locking position and is rotatable relative to intermediate frame 14 when the locking mechanism is in the releasing position so that the orientation of grip 174 relative to sleeping surface 24 can be adjusted, even when bracket 310 is mounted to bed 10.

Seat section 28 includes a plurality of apertures 330 extending generally downwardly as shown in FIGS. 1 and 3*b*. Pins 332 are mounted to upper flange 312 and extend downwardly therefrom so that when bracket 310 is mounted to bed 10, pins 332 are received by apertures 330. In addition, lower flanges 316, 318 straddle bar 34 connecting intermediate frame 14 to seat section 28 and hooks 320, 322 hook around intermediate frame 14 as shown best in FIG. 3*b*. Thus, hooks 320, 322 engage intermediate frame 14 and cooperate with pins 332 to mount bracket 310, and ambulatory assist arm 170, to bed 10. Although pins 332 extend through apertures 330 to connect bracket 310 to seat section 38, it is within the scope of the invention as presently perceived to employ hooks that hook over seat section 38 in a manner similar to hooks 320, 322 over intermediate frame 14 or similar attaching mechanisms to connect bracket 310 to seat section 38. However, use of pins 332 in apertures 330 provides additional support in the longitudinal direction so that bracket 310 and ambulatory assist arm 170 do not move toward head end 40 or foot end 42 during use.

Bracket 310 is locked to bed 10 using a locking mechanism having a plunger 334 slidably mounted to body portion 314 for movement between an inward locking position engaging bar 34 when bracket 310 is mounted to bed 10 as shown in FIG. 3*b* and an outward position spaced apart from bar 34. A cam 336 has a first end engaging plunger 334 and a second end engaging body portion 314. Cam 336 cooperates with plunger 334 and bracket 310 to hold bracket 310 and, thus, ambulatory assist arm 170 snugly against bed 10. When plunger 334 is in the locking position, bracket 310 is fixed to bed 10.

A lever mechanism 338 is coupled to plunger 334 and body portion 314 as shown in FIGS. 3*a* and 3*b*. Lever mechanism 338 includes a lever 340 movable between a locking position shown in FIG. 3*b* moving cam 336 and moving plunger 334 against body portion 314 and a releasing position withdrawing plunger 334 outwardly to a position spaced apart from bar 34 of bed 10. Bracket 310, and thus ambulatory assist arm 170, is only loosely connected to bed 10 when plunger 334 is in the releasing position with pins 332 being loosely received in apertures 330 and hooks 320, 322 loosely engaging intermediate frame 14 so that arm 170 can be easily removed from bed 10 when plunger 334 is in the releasing position.

Ambulatory assist arm 170 is thus easily mounted to bed 10 using bracket 310 as shown in FIG. 3*b*. When bracket 310 and arm 170 are mounted to bed 10, set screw 328 can be moved from the locking position to the releasing position allowing arm 170 to be rotated to adjust the orientation of arm 170 relative to sleeping surface 24 as shown in FIG. 1. If desired, arm 170 and bracket 310 can be easily removed from bed 10 without using tools. To do so, the caregiver simply moves lever 340 of lever mechanism 338 from the locking position to the releasing position withdrawing plunger 334 away from bar 34 so that bracket 310 can be lifted to disengage hooks 322, 324 from intermediate frame 14 and pins 332 from apertures 330 and then moved outwardly away from bed 10.

As described above, deck 20 includes longitudinally spaced-apart head, thigh, and leg sections 26, 30, 32, as shown in FIG. 1, that are individually movable relative to one another, relative to seat section 28, and relative to intermediate frame. In addition, intermediate frame 14 is movable relative to base frame 12 between the raised position and the lowered position. Drive assembly 16 can be activated to move intermediate frame 14 relative to base frame 12 and a second drive assembly (not shown) can be activated to move head, thigh, and leg sections 26, 30, 32 relative to intermediate frame 14. Control buttons including resident control buttons 266 and caregiver control buttons 268 are coupled to drive assembly 16 and to the second drive assembly so that activation of buttons 266, 268 controls the activation of both drive assembly 16 and the second drive assembly. Buttons 266, 268 are mounted to bed side rails 250 as shown best in FIGS. 4–6 with resident control buttons 266 facing inwardly toward deck 20 and caregiver control buttons 268 facing outwardly away from deck 20.

Figure 4:
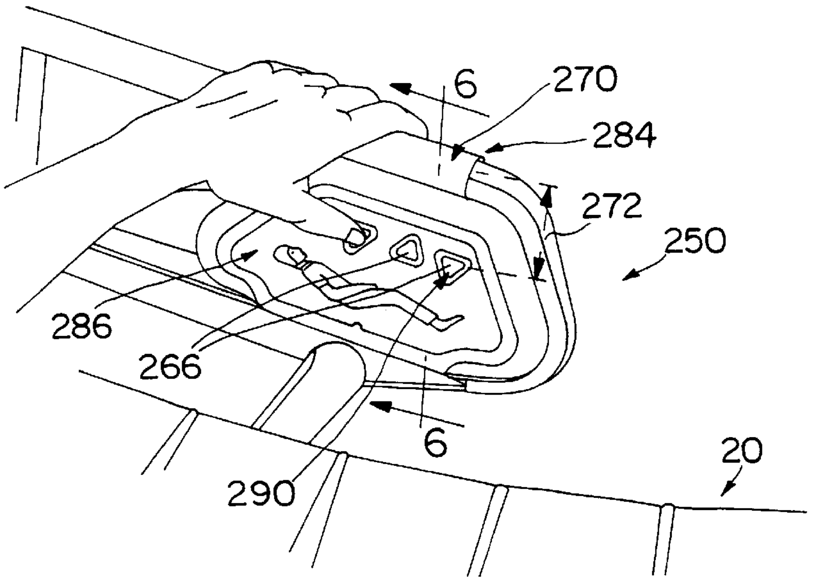
FIG. 4 is a perspective view of a side rail of the bed of FIG. 2b showing resident control buttons mounted to the side rail and facing inwardly toward the deck, he resident control buttons being generally horizontally aligned and spaced apart from the top of the side rail so that the resident's thumb is positioned adjacent to the resident control buttons when the resident's hand is comfortably resting on top of the side rail.
Figure 6:
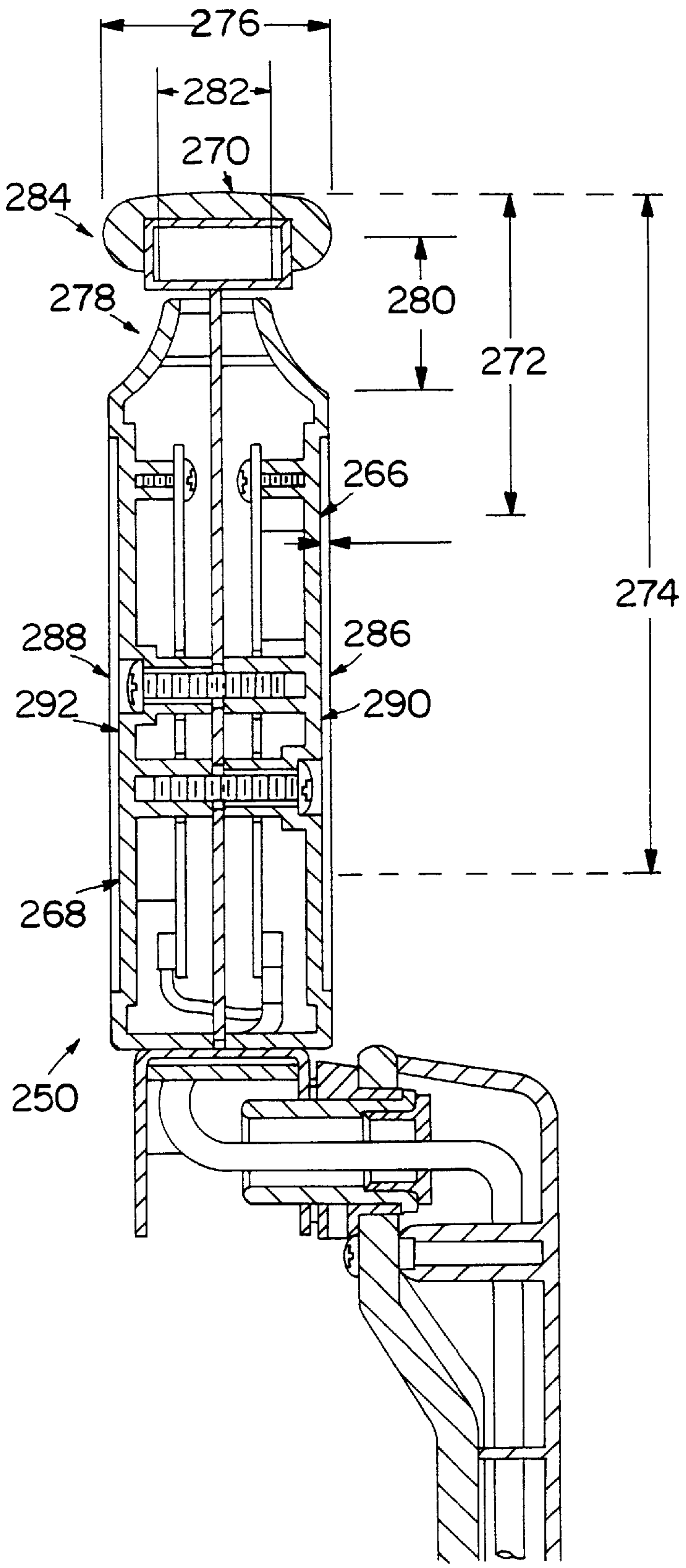
FIG. 6 is a sectional view taken along line 6—6 of FIG. 4 showing the relative positions of the caregiver control buttons and the resident control buttons and showing the contour of the side rail adjacent to the control buttons providing a comfortable "grasping point" for the resident and the caregiver when activating the buttons.

Each side rail 250 includes a top 270 and each resident control button 266 is spaced apart from top 270 of its respective side rail 250 by a distance 272, as shown in FIGS. 4 and 6, so that resident control buttons 266 on each side rail 250 are generally horizontally aligned. Distance 272 is selected so that when the hand of the resident rests on top 270 of side rail 250, the resident's thumb is comfortably positioned adjacent to resident control buttons 266 as shown in FIG. 4.

Figure 5:
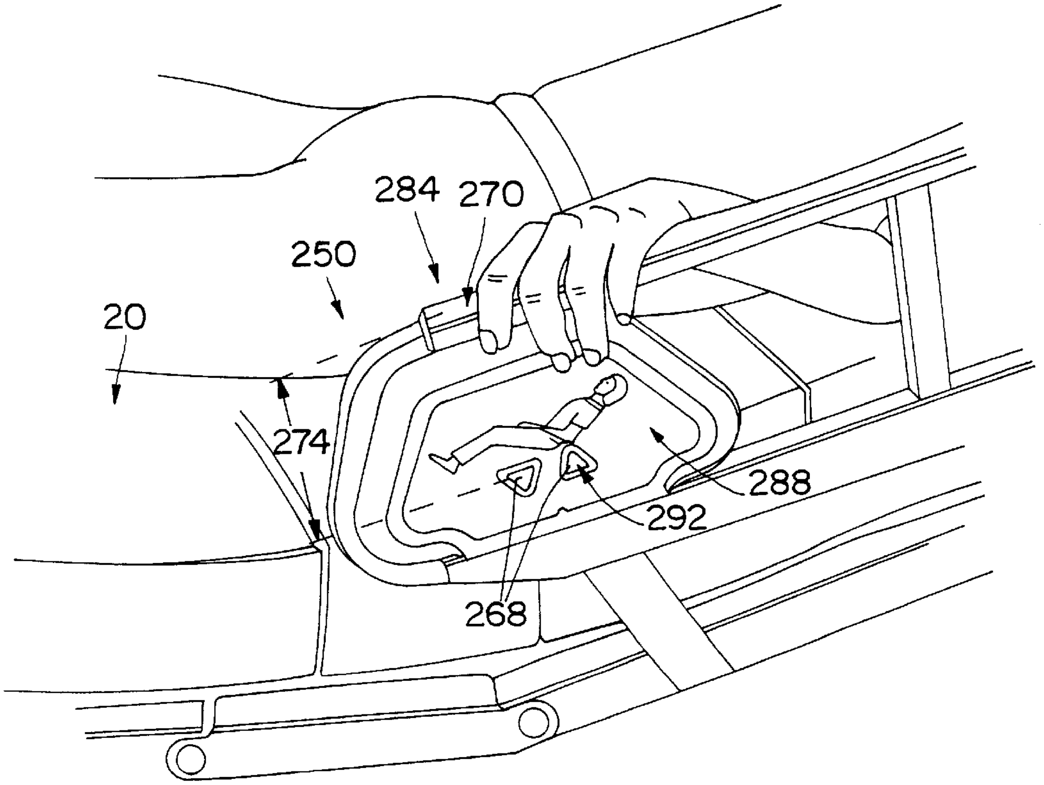
FIG. 5 is a view similar to FIG. 4 showing caregiver control buttons mounted to the side rail and facing outwardly away from the deck, the caregiver control buttons being generally horizontally aligned and spaced apart from the top of the side rail by a distance sufficient to minimize the inadvertent activation of the caregiver control buttons by the resident.

It can also be seen that each caregiver control button 268 is spaced apart from top 270 of its respective side rail 250 by a distance 274, as shown in FIGS. 5 and 6, so that caregiver control buttons 268 on each side rail 250 are generally horizontally aligned. Distance 274 is greater than distance 272 and is selected so that when the hand of the resident rests on top 270 of side rail 250, the resident's fingers are spaced apart from buttons 268 as shown in FIG. 5 to minimize the inadvertent operation of buttons 268 by the resident. In preferred embodiments, buttons 266, 268 are marked with Braille symbols to assist the visually impaired with the operation of bed 10.

Side rail 250 is shaped as shown best in FIG. 6 to provide the resident and the caregiver with a comfortable "grasping point" adjacent to buttons 266, 268 for grasping side rail 250 when operating buttons 266, 268. Side rail 250 is generally a first width 276 but is formed to include an undercut portion 278 extending downwardly from top 270 a distance 280 and thinning to a minimum width 282. Thus, side rail 250 includes a top portion 284 about which the fingers of the resident and the caregiver can curl to grasp top portion 284 of side rail 250 while operating buttons 266, 268.

It should also be noted that each side rail 250 includes an inwardly facing surface 286 facing toward deck 20 and an outwardly-facing surface 288 as shown best in FIG. 6. In addition, each resident control button 266 includes a button surface 290 and each caregiver control button 268 includes a button surface 292. Button surfaces 290 of resident control buttons 266 are recessed into side rail 250 relative to inwardly-facing surface 286 to minimize the inadvertent operation of resident control buttons 266 and button surfaces 292 of caregiver control buttons 268 are recessed into side rail 250 relative to outwardly-facing surface 288 to minimize the inadvertent operation of caregiver control buttons 268.

As described above, casters 114, 116, 118, 120 are coupled to base frame 12 and engage floor 18 as shown in FIG. 1 so that bed 10 can be moved along floor 18. Bed 10 also includes a first brake assembly 180 and a second brake assembly 182 as shown in FIGS. 1 and 7–9, each of the first and second brake assemblies 180, 182 being movable between a releasing position shown in FIG. 8 allowing free movement of bed 10 along floor 18 and a braking position shown in FIG. 9 restraining the movement of bed 10 along floor 18.

First brake assembly 180 includes a tube 184 connected to a plate 176 of base frame 12 and positioned to lie adjacent to a first caster 118. Tube 184 has a cylindrically-shaped hollow interior region (not shown). A post 186 is slidably received in the interior region of tube 184 so that post 186 can slide axially relative to tube 184 between the upward releasing position shown in FIG. 8 and the downward braking position shown in FIG. 9. A pedestal 188 is attached to post 186 so that when post 186 is in the releasing position pedestal 188 is spaced apart from floor 18 and when post 186 is in the braking position pedestal 188 firmly engages floor 18.

Second brake assembly 182 includes a tube 190 connected to a plate 178 of base frame 12 and positioned to lie adjacent to a second caster 120. Tube 190 has a cylindrically-shaped hollow interior region (not shown). A post 192 is slidably received in the interior region of tube 190 so that post 192 can slide axially relative to tube 190 between the upward releasing position shown in FIG. 8 and the downward braking position shown in FIG. 9. A pedestal 194 is attached to post 192 so that when post 192 is in the releasing position pedestal 194 is spaced apart from floor 18 and when post 192 is in the braking position pedestal 194 firmly engages floor 18 so that pedestal 194 cooperates with pedestal 188 to restrain movement of bed 10 along floor 18.

Figure 7:
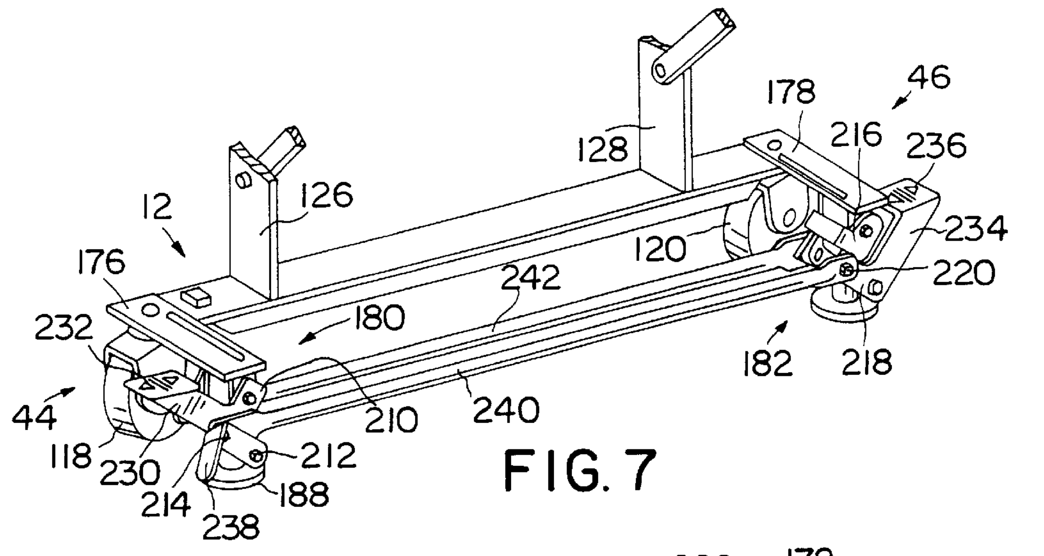
FIG. 7 is a perspective view of a first brake assembly and a second brake assembly of the bed of FIG. 1 showing a generally horizontal actuator connected to the first brake assembly, a generally horizontal actuator connected to the second brake assembly, and first and second bars connecting the second brake assembly to the first brake assembly so that movement of either actuator operates to lock and release both of the first and second brake assemblies.
Figure 8:
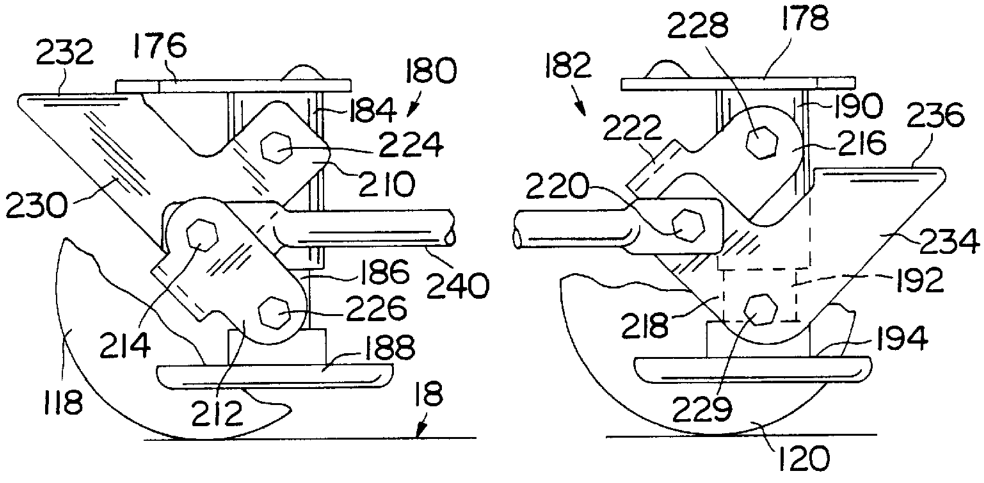
FIG. 8 is an end elevation view of the brake assemblies of FIG. 7 showing the actuators in upward releasing positions and the pedestals of each of the first and second brake assemblies at upward releasing positions spaced apart from the floor.
Figure 9:
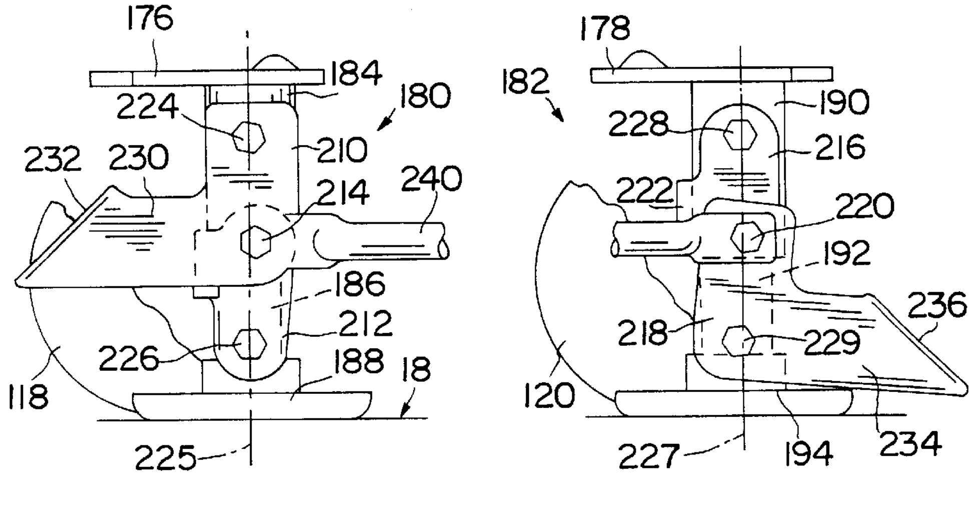
FIG. 9 is a view similar to FIG. 8 showing the actuators in the downward braking positions and the pedestals of each of the first and second brake assemblies at downward braking positions engaging the floor.

Tube 184 of first brake assembly 180 is connected to post 186 by an upper link 210 pivotally coupled to tube 184 and a lower link 212 pivotally coupled to post 186 as shown in FIGS. 7–9. Upper link 210 is pivotally coupled to lower link 212 by a pin 214 and upper and lower links 210, 212 are configured so that when pin 214 is moved to bring links 210, 212 generally into a linear alignment, as shown in FIG. 9, upper and lower links 210, 212 cooperate to push post 186 and pedestal 188 to the braking position.

Tube 190 of second brake assembly 182 is connected to post 192 by an upper link 216 pivotally coupled to tube 190 and a lower link 218 pivotally coupled to post 192 as shown in FIGS. 7–9. Upper link 216 is pivotally coupled to lower link 218 by a pin 220 and upper and lower links 216, 218 are configured so that when pin 220 is moved to bring links 216, 218 generally into a linear alignment, as shown in FIG. 9, upper and lower links 216, 218 cooperate to push post 192 and pedestal 194 to the braking position.

First brake assembly 180 further includes a tension spring (not shown) inside tube 184 and post 186, the tension spring having a first end connected to a bolt 224 extending through tube 184 and a second end connected to a bolt 226 extending through post 186. The tension spring of assembly 180 yieldably biases post 186 upward toward tube 184 so that pedestal 188 and post 186 are yieldably biased toward the releasing position. Likewise, second brake assembly 182 includes a tension spring (not shown) having a first end connected to a bolt 228 extending through tube 190 and a second end connected to a bolt 229 extending through post 192. The tension spring of assembly 182 yieldably biases post 192 upward toward tube 190 so that pedestal 194 and post 102 are yieldably biased toward the releasing position.

Upper link 216 is formed to include a stop 222 extending from upper link 216 inwardly toward tube 190 and lower link 212 is formed to include a stop 223 extending from lower link 212 inwardly toward tube 184 as shown in FIGS. 8 and 9. When post 192 and pedestal 194 are in the braking position, stop 222 engages tube 190 and stop 223 engages tube 184 as shown best in FIG. 9 to stop further movement of pin 220 and links 216, 218 away from the releasing position.

Upper link 210 of first brake assembly 180 is formed to include an actuator 230 fixed to upper link 210 and extending generally upwardly and outwardly therefrom when brake assembly 180 is in the releasing position as shown in FIG. 8. Actuator 230 terminates at a foot pedal 232 that extends generally horizontally when assembly 180 is in the releasing position. When a caregiver depresses foot pedal 232, actuator 230 and upper link 210 pivot downwardly relative to tube 184 and pin 214 moves away from the releasing position and toward the braking position until stop 223 of lower link 212 engages tube 184, pin 214 moves to an "over center position" past a line 225 defined by bolts 224, 226, pedestal 188 engages floor 18, and assembly 180 reaches the braking position shown in FIG. 9 having actuator 230 extending generally outwardly from upper link 210.

Lower link 218 of second brake assembly 182 is also formed to include an actuator 234. Actuator 234 is fixed to lower link 218 and extends generally upwardly and outwardly therefrom when brake assembly 182 is in the releasing position as shown in FIG. 8. Actuator 234 terminates at a foot pedal 236 that extends generally horizontally when assembly 182 is in the releasing position. When a caregiver depresses foot pedal 236, actuator 234 pivots downwardly and lower link 218 pivots upwardly relative to tube 190 and pin 220 moves away from the releasing position and toward the braking position until stop 222 engages tube 190, pin 220 moves to an "over center position" past a line 227 defined by bolts 228, 229, pedestal 194 engages floor 18, and assembly 182 reaches the braking position shown in FIG. 9 having actuator 234 extending generally outwardly from upper link 216.

First and second transverse bars 240, 242 are pivotally coupled to pin 214 of first brake assembly 180 and to pin 220 of second brake assembly 182 as shown in FIGS. 7–9. Bars 240, 242 thus prevent movement of pin 220 independent of pin 214 thereby preventing movement of assembly 180 independent of assembly 182. As a result, when a caregiver depresses foot pedal 232 of first brake assembly 180 to move assembly 180 from the releasing position to the braking position, pin 214 moves toward the braking position moving bars 240, 242 and thus pin 220 from the releasing position toward the braking position. As pin 220 moves toward the braking position, post 192 and pedestal 194 are moved by upper and lower links 216, 218 of second braking assembly from the releasing position to the braking position. Once second braking assembly 182 reaches the braking position, stop 222 engages tube 190, stop 223 engages tube 184, and the movement of pin 220 away from the releasing position is stopped, stopping the movement of bars 240, 242, stopping the movement of pin 214, and thus stopping the movement of first braking assembly away from the releasing position.

To move first brake assembly 180 from the braking position of FIG. 8 to the releasing position of FIG. 8, the caregiver can simply lift foot pedal 232, thereby swinging upper link 210 upwardly and pulling pin 214 outwardly so that upper and lower links 210, 212 cooperate to pull post 186 into tube 184, thereby pulling pedestal 188 away from floor 18 from the braking position toward the releasing position. In addition, second brake assembly 182 is provided with an auxiliary pedal 238 appended to upper link 216 and extending away from lower link 218 as shown in FIG. 7. When the caregiver depresses auxiliary pedal 238, pin 220 moves outwardly and upper and lower links 216, 218 cooperate to pull post 186 into tube 184, thereby pulling pedestal 188 away from floor 18 and toward the releasing position. As described above, bars 240, 242 connect pin 214 of first brake assembly 180 to pin 220 of second brake assembly 182 so that moving first brake assembly 180 from the braking position to the releasing position automatically moves second brake assembly 182 from the braking position to the releasing position.

Thus bed 10 includes first brake assembly 180 coupled to base frame 12 adjacent to first caster 118 as shown in FIGS. 7–9. Assembly 180 includes pedestal 188 movable between the releasing position spaced apart from floor 18 and the braking position engaging floor 18. Bed 10 also includes second brake assembly 182 coupled to base frame 12 adjacent to second caster 120. Assembly 182 includes pedestal 194 movable between the releasing position spaced apart from floor 18 and the braking position engaging floor 18. Assembly 180 includes actuator 230 movable between the releasing position and the braking position. Assembly 182 is coupled to assembly 180 so that when actuator 230 is moved to the braking position, pedestal 188 of assembly 180 moves to the braking position and pedestal 194 moves to the braking position. In addition, when actuator 230 is moved to the releasing position, pedestal 188 of assembly 180 moves to the releasing position and pedestal 194 of assembly 182 moves to the releasing position.

Figure 10:
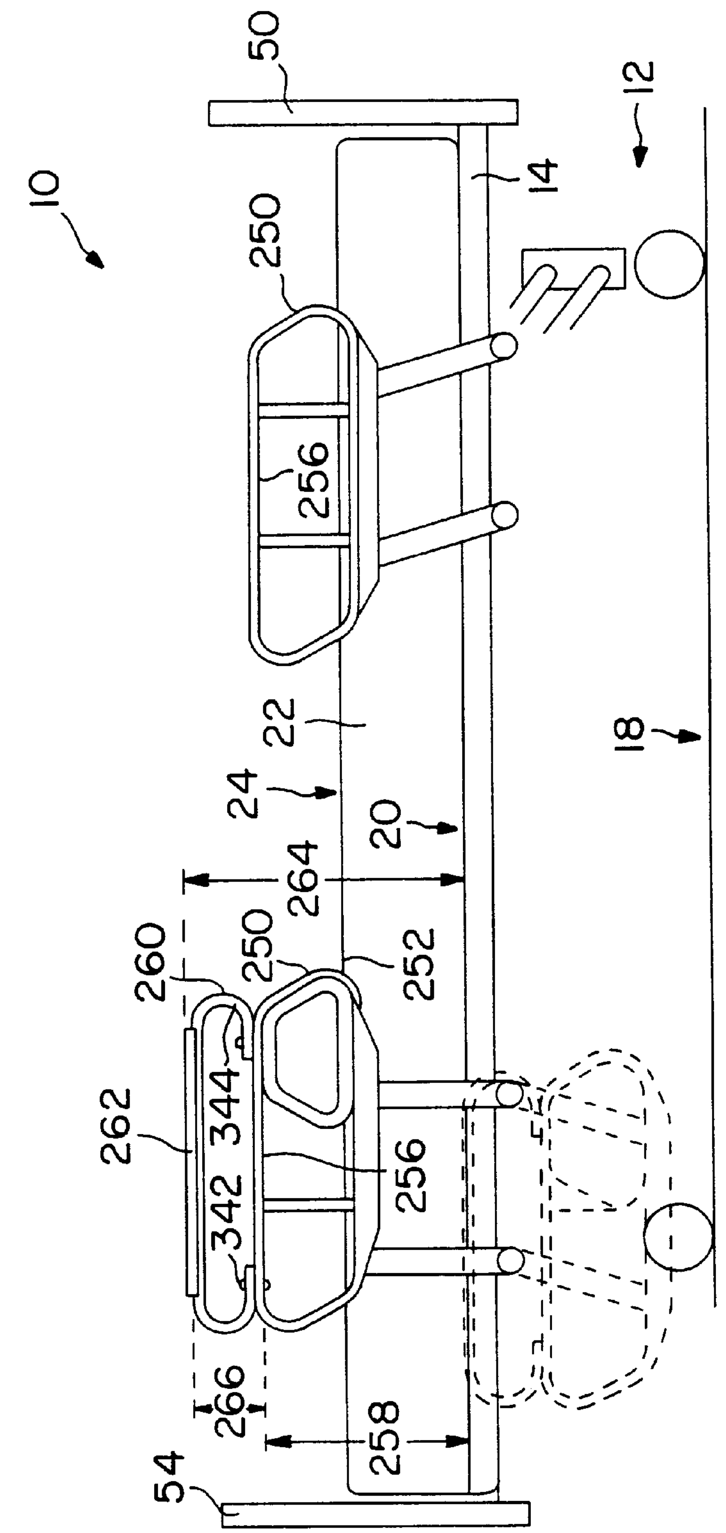
FIG. 10 is a view similar to FIG. 2b showing first and second side rails, the first side rail including a first embodiment of a side rail extension member coupled to a top bar of the first side rail to extend the vertical coverage provided to the resident (not shown) to minimize the inadvertent movement of the resident past the side of the sleeping surface.

Bed 10 additionally includes side rails 250, as shown in FIGS. 2*a*, 2*b*, and 10–13, pivotally coupled to intermediate frame 14 for movement between a lowered position as shown (in phantom) in FIG. 10 and a raised position as shown in FIGS. 2*a*, 2*b*, and 10. Side rails 250 are positioned to lie adjacent to sides 252, 254 of sleeping surface 24 to minimize the inadvertent movement of the resident past the sides 252, 254 and off of sleeping surface 24.

Each side rail 250 includes a top bar 256 positioned to lie along one of sides 252, 254 and above sleeping surface 24 when side rail 250 is in the raised position as shown in FIG. 10. Side rails 250 are coupled to intermediate frame 14 so that top bar 256 is a fixed distance 258 above deck 20 when side rail 250 is in the raised position.

On conventional hospital beds, the distance between the top of the side rail when the side rail is in its uppermost position and the resident-support deck is established so that a minimum amount of "vertical coverage" is provided along the sides of the sleeping surface between the sleeping surface and the top of the side rail. The distance between the top of the sleeping surface and the top of the side rail is established to minimize the inadvertent movement of the resident over the side rail and off of the sleeping surface. However, the thicknesses of mattresses, and thus the distance between the top of the deck and the sleeping surface, varies for different types of mattresses placed on the deck. Thus, designers typically design side rails so that the distance between the top of the side rail and the deck is large enough that sufficient coverage is provided between the sleeping surface and the top of the side rail even with the thickest mattress expected for use on the bed. As a result, when thinner mattresses are installed on the deck, the distance between the sleeping surface and the top of the side rail is excessive.

Side rails 250 of bed 10 provide less vertical coverage than typically found as described above. Instead, top bar 256 is spaced apart from deck 20 by distance 258 which provides insufficient coverage above sleeping surface 24 when thick mattresses are installed on deck 20. As a result, when thinner mattresses are installed on deck 20, the resident on sleeping surface 24 has a more open and comfortable environment that is more like the environment that the resident experiences at home.

Figure 12:
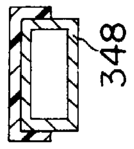
FIG. 12 is a sectional view taken along line 12—12 of FIG. 1 showing a channel of the side rail extension member engaging one of the sides of the side rail.
Figure 11:
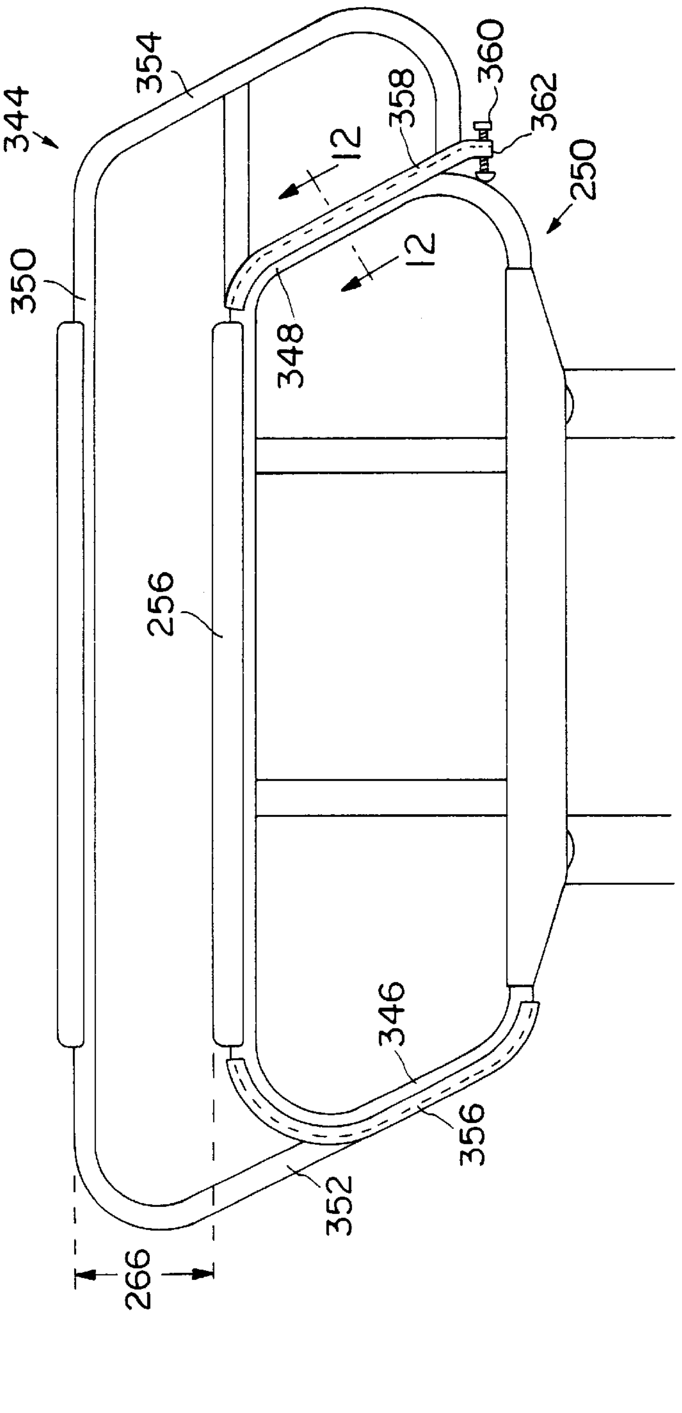
FIG. 11 is an elevation view of the first side rail of FIG. 10 including a second embodiment of a side rail extension member showing channels of the side rail extension member engaging sides of the side rail and a locking pin of the side rail extension member engaging one of the sides of the side rail to lock the side rail extension member in place on the side rail.
Figure 13:
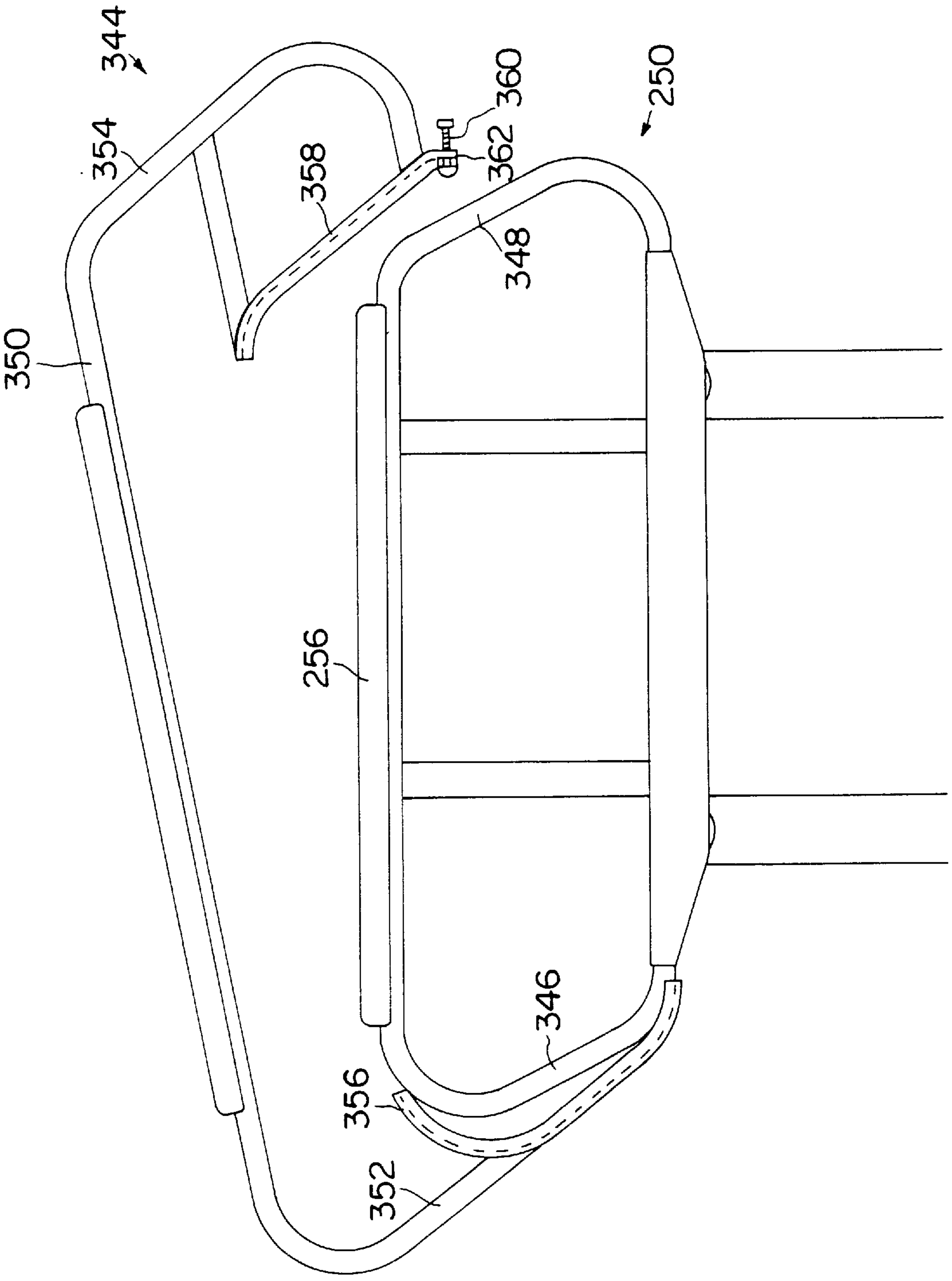
FIG. 13 is a view similar to FIG. 11 showing the locking pin of the side rail extension member pulled away from the side rail so that the side rail extension member can be easily removed from the side rail.

When a thicker mattress is installed on deck 20, additional vertical coverage is provided by installing a side rail extension member 260, 344 onto each side rail 250 as shown for one of side rails 250 in FIG. 10 having a first embodiment of a side rail extension member 260 connected to side rail 250 and in FIGS. 11–13 showing a second embodiment of a side rail extension member 342 connected to side rails 250. When one of side rail extension members 260, 344 is attached to side rail 250, side rail 250 and side rail extension member 260, 344 cooperate to provide vertical coverage above sleeping surface 24. Side rail extension member 260, for example, has a top bar 262 spaced apart from deck 20 by a distance 264 shown in FIG. 10 when side rail 250 is in the raised position so that use of side rail extension member 260 provides additional vertical coverage equivalent to a distance 266.

Side rail extension member 260 is fastened to top bar 256 of side rail 250 as shown in FIG. 10 when a thick mattress is placed on deck 20 so that sufficient vertical coverage can be provided above sleeping surface 24. When a thinner mattress is installed on deck 20, side rail extension member 260 is easily removed so that top bar 256 of side rail 250 defines the full extent of vertical coverage provided by side rail 250 along sides 252, 254 of sleeping surface 24. Thus, side rail extension member 260 can be connected to top bar 256 of side rail 250 to extend generally upwardly therefrom. However, side rail extension member 260 is removable from top bar 256 when sleeping surface 24 is configured so that distance 258 between top bar 256 and sleeping surface 24 provides sufficient vertical coverage along sides 252, 254 and above sleeping surface 24.

Side rail extension member 260 can be fastened to side rail 250 using fasteners 342 such as bolts or pins as shown in FIG. 10. However, ease of installation and removal is enhanced using the second embodiment of a side rail extension 344 as shown in FIGS. 11–13. Side rail 250 includes a first side bar 346 extending generally downwardly from top bar 256 and a second side bar 348 spaced apart from first side bar 346 and extending generally downwardly from top bar 256 and side rail extension member 344 connects to first and second side bars 346, 348.

Side rail extension member 344 includes a top bar 350, a first side bar 352 extending generally downwardly from top bar 350, and a second side bar 354 spaced apart from first side bar 352 and extending generally downwardly from top bar 350 as shown in FIGS. 11 and 13. A first channel member 356 is placed over first side bar 352 and a second channel member 358 is placed over second side bar 354. Channel member 356 engages first side bar 346 of side rail 250 and channel member 358 engages second side bar 348 when side rail extension member 344 is installed on side rail 250 as shown in FIGS. 11 and 12.

A bolt 360 is threadably received by a downwardly-extending portion 362 of channel member 358 so that when side rail extension member 344 is placed on side rail 250 and bolt 360 is moved to engage second side bar 348 of side rail 150, bolt 360 cooperates with first and second channel members 356, 358 to fix side rail extension member 344 to side rail 250. However, side rail extension member 344 is easily removed from side rail 250 simply by withdrawing bolt 360 away from side bar 348 of side rail 250 and lifting side rail extension member 344 away from side rail 250.

Thus, when a thin mattress 22 is carried by deck 20 so that the distance from top bar 256 to sleeping surface 24 provides at least the desired amount of vertical coverage minimizing the inadvertent movement of the resident from sleeping surface 24, side rail 250 can be used without a side rail extension member 260, 344 providing the resident with a comfortable "open" feel denied to the resident when taller side rails 250 are used. However, if mattress 22 is thick so that insufficient vertical coverage is provided by side rails 250 alone, side rail extension member 344 can be mounted to side rail 250 to extend the extent of vertical coverage simply by placing side rail extension member 344 on side rail 250 so that channel member 356, 358 engage side bars 346, 348, respectively, and then moving bolt 360 into engagement with second side bar 348.

Bed 10 includes features suited for regular daily use by the general resident population of a long-term care facility. In particular, bed 10 is easy to operate both by the geriatric population and the nursing aide staff. Bed 10 will permit safe and easy positioning and egress, thereby enhancing the independence of residents. In addition, bed 10 reduces the amount of manual lifting done by the staff through easy egress and operation of the bed while they assist residents with their activities of daily living. Resident egress is assisted through the lower height of the sleeping surface 24 achieved at the lowered position than is found on conventional beds, through side rails 250, and through ambulatory assist arm 170.

Although the invention has been described in detail with reference to a certain preferred embodiment, variations and modifications exist within the scope and spirit of the invention as described and defined in the following claims.

What is claimed is:

1. A bed comprising:

a base frame, a bed deck located above the base frame, an intermediate frame carrying the bed deck, the intermediate frame being mounted to the base frame for movement relative to the base frame between a raised position spaced apart above the base frame and a lowered position below the raised position, a side rail mounted to the intermediate frame and extending generally upwardly therefrom, the side rail including a top portion having a first width and an undercut portion spaced apart from the top portion, the undercut portion having a second width that is less than the first width, a drive assembly coupling the intermediate frame to the base frame, the drive assembly moving the intermediate frame between the raised position and the lowered position when the drive assembly is activated, and control buttons mounted on the side rail and coupled to the drive assembly so that activation of the control buttons activates the drive assembly, the control buttons including resident control buttons facing toward the bed deck and caregiver control buttons facing away from the bed deck, the resident control buttons being spaced apart from the top portion by a first distance and the caregiver control buttons being spaced apart from the top portion by a second distance that is greater than the first distance, the resident control buttons being located adjacent the undercut portion, the undercut portion cooperating with the top portion to define a grasping point adjacent to the resident control buttons that can be grasped by the resident when operating the resident control buttons.

2. The bed of claim 1, wherein the bed deck is an articulated deck having longitudinally spaced-apart head, seat, and leg sections, at least one of the head, seat, and leg sections being a movable section pivotally coupled to the intermediate frame for movement between a generally horizontal lowered position and an upward raised position, and further comprising a second drive assembly coupling the movable section to the intermediate frame, the second drive assembly moving the movable section between the raised and lowered positions when the second drive assembly is activated, the control buttons further including second resident control buttons coupled to the second drive assembly, mounted to the side rail, and facing toward the bed deck and second caregiver control buttons coupled to the second drive assembly, mounted to the side rail, and facing away from the bed deck, the second resident control buttons being spaced apart from the top by a third distance and the second caregiver control buttons being spaced apart from the top by a fourth distance that is greater than the third distance.

3. The bed of claim 2, wherein the third distance is generally equal to the first distance and the fourth distance is generally equal to the second distance so that the first and second resident control buttons are generally horizontally aligned and the first and second caregiver control buttons are generally horizontally aligned.

4. The bed of claim 1, wherein the caregiver control buttons are associated with an indicia indicating a purpose of the caregiver control buttons, the indicia being located above the caregiver control buttons.

5. The bed of claim 1, wherein the resident control buttons are associated with an indicia indicating a purpose of the resident control buttons, the indicia being located below each resident control button.

6. The bed of claim 1, wherein at least one of the control buttons is marked with a Braille symbol.

7. A bed comprising:

a base frame, a bed deck located above the base frame, an intermediate frame carrying the bed deck, the intermediate frame being mounted to the base frame for movement relative to the base frame between a raised position spaced apart above the base frame and a lowered position below the raised position, a side rail mounted to the intermediate frame and extending generally upwardly therefrom, the side rail including a top portion having a first width and an undercut portion spaced apart from the top portion, the undercut portion having a second width that is less than the first width, a drive assembly coupling the intermediate frame to the base frame, the drive assembly moving the intermediate frame between the raised position and the lowered position when the drive assembly is activated, and a plurality of control buttons mounted on the side rail, the control buttons including resident control buttons facing toward the bed deck and caregiver control buttons facing away from the bed deck, at least one of the plurality of control buttons being coupled to the drive assembly so that activation of at least one control button activates the drive assembly, the resident control buttons being spaced apart from the top portion by a first distance and the caregiver control buttons being spaced apart from the top portion by a second distance that is greater than the first distance, the resident control buttons being located adjacent the undercut portion, the undercut portion cooperating with the top portion to define a grasping point adjacent to the resident control buttons that can be grasped by the resident when operating the resident control buttons.

8. The bed of claim 7, wherein the bed deck is an articulated deck having longitudinally spaced-apart head, seat, and leg sections, at least one of the head, seat, and leg sections being a movable deck section pivotally coupled to the intermediate frame for movement between a generally horizontal lowered position and an upward raised position, and further comprising a second drive assembly coupling the movable deck section to the intermediate frame, the second drive assembly moving the movable deck section between the raised and lowered positions when the second drive assembly is activated, and wherein at least one of the plurality of control buttons is coupled to the second drive assembly so that activation of at least one of the plurality of control buttons activates the second drive assembly.

9. The bed of claim 8, wherein the plurality of control buttons include second resident control buttons coupled to the second drive assembly, mounted to the side rail, and facing toward the bed deck and second caregiver control buttons coupled to the second drive assembly, mounted to the side rail, and facing away from the bed deck, the second resident control buttons being spaced apart from the top by a third distance and the second caregiver control buttons being spaced apart from the top by a fourth distance that is greater than the third distance.

10. The bed of claim 9, wherein the third distance is generally equal to the first distance and the fourth distance is generally equal to the second distance so that the first and second resident control buttons are generally horizontally aligned and the first and second caregiver control buttons are generally horizontally aligned.

11. The bed of claim 7, wherein the caregiver control buttons are associated with an indicia indicating a purpose of the caregiver control buttons, the indicia being located above the caregiver control buttons.

12. The bed of claim 7, wherein the resident control buttons are associated with an indicia indicating a purpose of the resident control buttons, the indicia being located below each resident control button.

13. The bed of claim 7, wherein at least one of the control buttons is marked with a Braille symbol.

14. A bed comprising:

a base frame, an articulated bed deck located above the base frame, the articulated bed deck having longitudinally spaced-apart head, seat, and leg deck sections, an intermediate frame carrying the articulated bed deck, the intermediate frame being coupled to the base frame, and at least one of the head, seat, and leg deck sections being a movable deck section pivotally coupled to the intermediate frame for movement between a generally horizontal lowered position and an upward raised position, a side rail mounted to the intermediate frame and extending generally upwardly therefrom, the side rail including a top portion having a first width and an undercut portion spaced apart from the top portion, the undercut portion having a second width that is less than the first width, a drive assembly coupling the movable section to the intermediate frame, the drive assembly moving the movable deck section between the raised and lowered positions when the drive assembly is activated, and a plurality of control buttons mounted on the side rail, the control buttons including resident control buttons facing toward the bed deck and caregiver control buttons facing away from the bed deck, at least one of the plurality of control buttons being coupled to the drive assembly so that activation of the at least one control button activates the drive assembly, the resident control buttons being spaced apart from the top portion by a first distance and the caregiver control buttons being spaced apart from the top portion by a second distance that is greater than the first distance, the resident control buttons being located adjacent the undercut portion, the undercut portion cooperating with the top portion to define a grasping point adjacent to the resident control buttons that can be grasped by the resident when operating the resident control buttons.

15. The bed of claim 14, wherein the intermediate frame is coupled to the base frame for movement relative to the base frame between a raised position spaced apart above the base frame and a lowered position below the raised position, and further comprising a second drive assembly coupling the intermediate frame to the base frame, the second drive assembly moving the intermediate frame between the raised position and the lowered position when the drive assembly is activated, and wherein at least one of the plurality of control buttons being coupled to the second drive assembly so that activation of at least one control button activates the second drive assembly.

16. The bed of claim 14, wherein the caregiver control buttons are associated with an indicia indicating a purpose of the caregiver control buttons, the indicia being located above the caregiver control buttons.

17. The bed of claim 14, wherein the resident control buttons are associated with an indicia indicating a purpose of the resident control buttons, the indicia being located below each resident control button.

18. The bed of claim 14, wherein at least one of the control buttons is marked with a Braille symbol.

* * * * *